No. 836,578. PATENTED NOV. 20, 1906.
M. H. DE HORA.
VEHICLE WHEEL.
APPLICATION FILED NOV. 16, 1905.
2 SHEETS—SHEET 1.
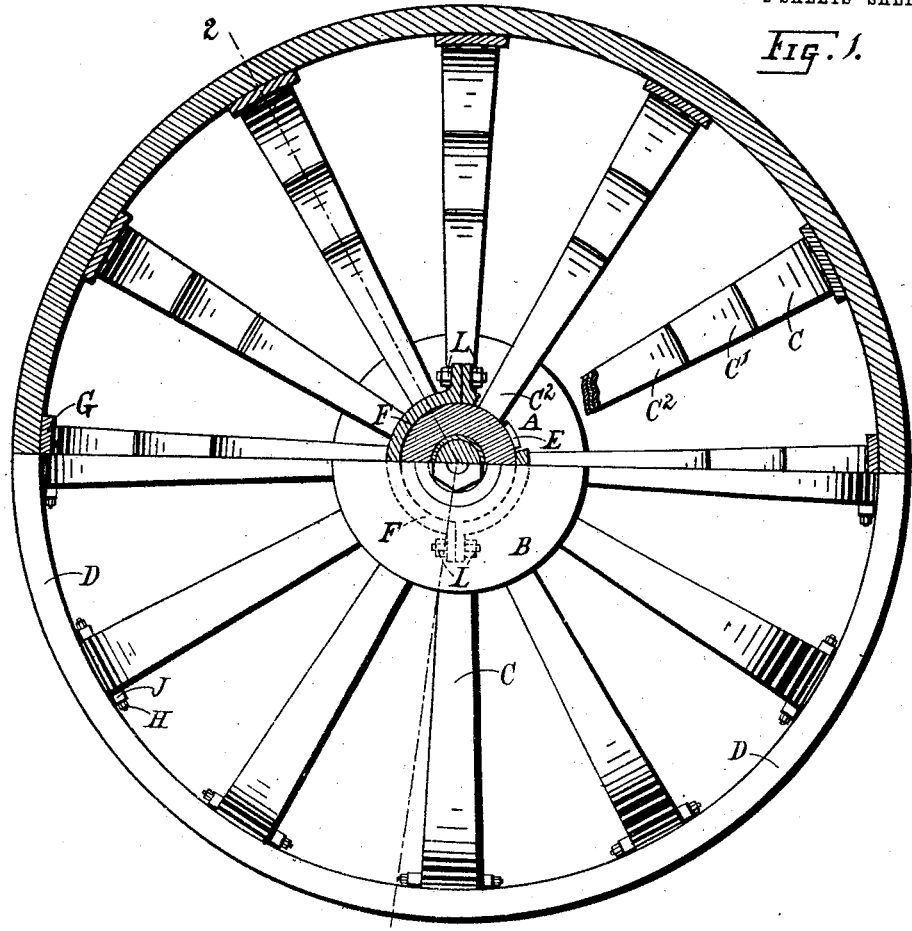
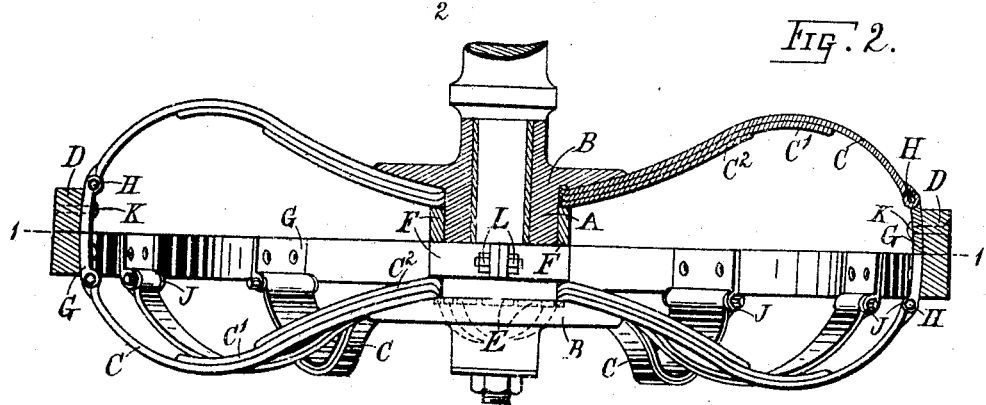
Witnesses.
A. L. Annison
F. F. Meadows
Inventor.
M. H. de Hora.
By Arthur H. Stanley
Attorney.

No. 836,578. PATENTED NOV. 20, 1906.
M. H. DE HORA.
VEHICLE WHEEL.
APPLICATION FILED NOV. 16, 1905.
2 SHEETS—SHEET 2.
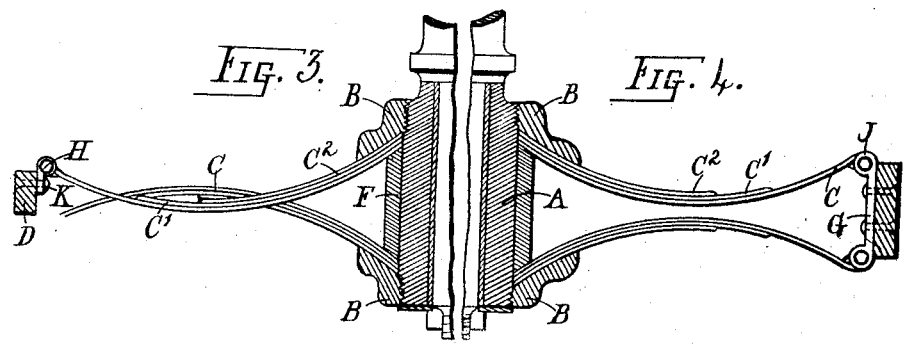
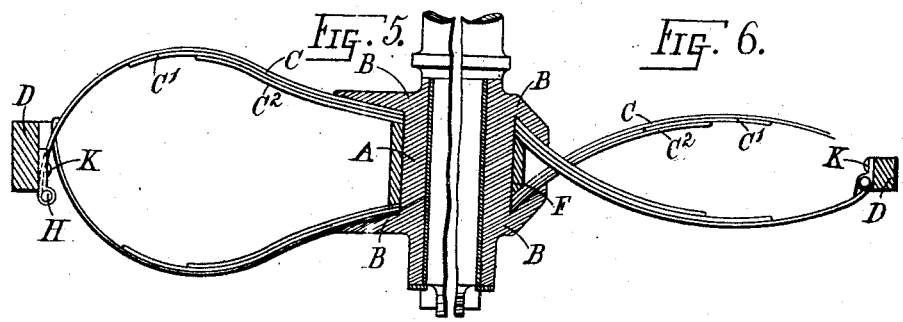
Witnesses.
A. L. Anneson
F. F. Meadows
Inventor.
M. H. de Hora.
By Arthur H Stanley
Attorney.

UNITED STATES PATENT OFFICE.

MANUEL HERRERA DE HORA, OF LONDON, ENGLAND.

VEHICLE-WHEEL.

No. 836,578.    Specification of Letters Patent.    Patented Nov. 20, 1906.

Application filed November 16, 1905. Serial No. 287,622.

*To all whom it may concern:*

Be it known that I, MANUEL HERRERA DE HORA, a citizen of the United States of America, at present residing at 24 Priory Court Mansions, Mazenod avenue, West Hampstead, London, England, have invented certain new and useful Improvements in or Relating to Vehicle-Wheels, of which the following is a specification.

This invention relates to wheels of motor-cars, carts, busses, wagons, and other wheeled vehicles; and it consists of certain improvements in the same and in their manner of construction, whereby the vibration or jolting due to the roughness of the track is absorbed or isolated from the vehicle and at the same time the wheel itself is not only of exceptionally strong construction, but is so designed as to be easily capable of repair to any part of it which may become damaged. Moreover, it lends itself conveniently to the employment of a double or extra wide tread, which will in a large measure reduce the liability of side slipping or skidding of the wheels. Cheapness and simplicity are also two important factors in connection with the improved wheel, which will run over obstacles while allowing the body of the vehicle to continue on its way with little or no communication of shock. The necessity for pneumatic tires with their heavy expense is entirely done away with.

According to the present invention the spokes of the wheel are composed of laminated steel springs or strips of spring-steel or of any other resilient material. These are fitted between the nave and rim in such a manner that they have a permanent curvature, such as would be seen in a diametrical cross-section view of the wheel. In an elevation or side view of the wheel these spring-spokes would appear to occupy the same positions as ordinary spokes, whether radial or tangential, and these positions would probably remain unvariable, as a rule, although I do not wish to exclude spokes of the kind aforesaid, which might in some circumstances be hinged so that they could swing out of the radial position when under a strain, should such be desirable. My invention provides, essentially, a wheel in which the spokes themselves spring or bulge outward or inward (as the case may be) transversely to and not within the plane of the wheel, such spokes being hinged or otherwise attached in any convenient manner to the nave and to the rim and affording particular facility for the building of the wheel without special plant or highly-trained labor and for the speedy exchange of any damaged spokes or repair of any injured part or parts of the wheel. It will be possible to dispense with the usual carriage or antivibration-springs, for these are virtually embodied in the special spring-spokes, which themselves serve the double function of springs and spokes. The construction of the car will consequently be simpler.

In further describing my said invention reference will hereinafter be made to the accompanying drawings, wherein—

Figure 1 represents a wheel constructed according to one form of the invention, the upper half of the figure being a section on line 1 1 of Fig. 2 and the lower half a side elevation. Fig. 2 is a view at right angles to Fig. 1, the upper half of the figure being a thin section on the bent line 2 2 of Fig. 1 and the lower half a plan or edge elevation of half of the wheel, the rim being in section. Fig. 3 shows a section across part of a wheel having a slightly-modified shape and arrangement of spokes, and Fig. 4 still another modification. Figs. 5 and 6 show further slight modifications.

According to the invention as illustrated in Figs. 1 and 2 the nave A is provided with two flanges or collars B. These are situated a little distance apart and are either themselves an integral part of the nave or an attachment thereon, or one collar may be made removable. The inner extremities of the spring-spokes C are between the two collars B, which are turned or beveled slightly outward, so as to form a suitable surface to receive the side pressure of the said spokes. The latter radiate outward in straight lines or nearly straight lines for a short distance from the collars, but their outer ends are returned inward like a bow, their extremities being almost horizontal where they are secured to the rim D, a broad metal one by preference, on which may be carried any suitable kind of tire, although the latter is not indispensable to the satisfactory running of the wheel. According to the drawings the inner extremities of the spokes are secured as follows: It may first be explained that the latter are each composed of spring-steel strips in three laminations C C' C²; (or more or less,) the inner laminations being successively shorter than the outer ones, but all of them starting from the nave A. A series of recesses E occurs in the inner faces of the collars B, and the extreme ends of the spokes C, &c., are bent so as to enter these recesses. They are prevented from escaping by a divided flat ring F, clamped around the nave A (by bolts L passed through flanges in the ring) after the spokes have been put in their places. This ring is drawn partly broken in Fig. 1, so as to show the spoke—i. e., the lamination C²—butting onto the nave A, and one of the spokes is also broken to show one of the recesses E aforesaid in the collar B. Nevertheless instead of the mode of attachment just described the inner extremities of the spokes may be bolted to the collars or may be clamped onto short radial arms instead of the collars or, indeed, may be fastened in a variety of ways which need not be here specified. The outer extremities of the spokes are hinged to metal plates G, each spoke or lamination C being rolled into a sleeve for holding the hinge-pin H and the plates G having knuckles J for receiving the ends of said hinge-pins H. Said plates G are secured to the inside periphery of the rim D by means of bolts or rivets K, but any other means of fastening may be employed either for said plates or for the spokes. Pin-and-slot devices may be used for keeping the laminations of the respective spokes close to one another without interfering with their sliding movement. It may not be necessary in all wheels for the spring-spokes to be composed of laminated strips. In building the wheel the spokes are sprung into position upon the nave by any suitable contrivance after being secured to the rim. This will be facilitated if one of the collars B, as already suggested, is detachable, (as in Figs. 3 and 4,) so that it can be applied upon the nave after the spokes are in place. On the other hand, some persons may prefer the rim to be applied after the inner ends of the spokes have been placed in position.

A different shape of collar is shown in Figs. 3 and 4, where a wheel is shown where the spring-spokes are curved concavely or opposite to those previously described. In Fig. 3 the spokes C alternate in position around the wheel, and their more central parts overlap one another beyond the center plane of the wheel, being either bent in this manner when the wheel is constructed or else adapted to do so when subjected to the working load. In Fig. 4 the spokes are shown not overlapping. In both of these figures it will be seen that the shorter laminations of the spring-spokes have to be on the outside of the wheel instead of on the inside, as in Figs. 1 and 2. The other details of the wheel may be similar to those already described.

In Figs. 5 and 6 the spring-spokes C of a type similar to Figs. 1 and 2 are arranged so as to cross one another—that is, the spokes which lead from the off side of the rim are fastened to the on side of the nave, and vice versa. These spokes may, if preferred, be of the concave type. In some cases a pair of spokes may be fashioned from one length of springy material undivided at the hub or at the rim. The rim may be formed in any suitable way for running on the road or track with or without a tire or tires. For the spokes it is preferable to use strips which are narrower toward the hub than toward the rim, as shown. They may be fastened to the rim D in other ways than those described, as mentioned already. The plates G could even be arranged obliquely to the line of the wheel, the spring-spokes in such a case meeting the rim at an angle which is not a right angle.

Having thus described my said invention, what I claim is—

1. In a vehicle-wheel, spokes consisting of curved springs more pliable at one end than at the other, means for attaching the stiffer ends rigidly to the hub, and means for attaching the more pliable ends flexibly to the rim, said spokes being arranged to bend transversely to the plane of the wheel, substantially as described.

2. In a vehicle-wheel, spokes consisting of curved springs arranged to bend transversely to the plane of the wheel means for securing their inner ends rigidly to the hub, and hinged means for attaching their outer ends to the rim, substantially as described.

3. In a vehicle-wheel, spokes arranged to bend transversely to the plane of the wheel, a pair of collars on the hub, means for clamping the inner ends of said spokes between the said collars, and hinged means for attaching their outer ends to the rim, substantially as described.

4. In a vehicle-wheel, spokes arranged to bend transversely to the plane of the wheel, a pair of collars on the hub for the purpose of retaining the inner ends of said spokes, a distance-ring for keeping the latter in position against said collars, and means for attaching the outer ends of said spokes to the wheel-rim, substantially as described.

5. In a vehicle-wheel, spokes arranged to bend transversely to the plane of the wheel, a pair of collars on the hub, means for clamping the inner ends of said spokes between the said collars, and metal plates on the wheel-rim provided with knuckles for enabling the ends of the spokes to be thereby hinged, substantially as described.

6. In a vehicle-wheel, spokes arranged to bend transversely to the plane of the wheel, a pair of collars on the hub for the purpose of retaining the inner ends of said spokes, a distance-ring for keeping the latter in position against said collars, and metal plates on the wheel-rim provided with knuckles for enabling the ends of the spokes to be thereby hinged, substantially as described.

In witness whereof I have hereunto set my hand in the presence of two witnesses.

MANUEL HERRERA DE HORA.

Witnesses:
A. L. ANNISON,
F. F. MEADOWS.